United States Patent [19]
Nguyen

[11] Patent Number: 5,136,579
[45] Date of Patent: Aug. 4, 1992

[54] DIGITAL COMMUNICATIONS NETWORK WITH UNLIMITED CHANNEL EXPANDABILITY

[75] Inventor: Quoc V. Nguyen, Lake Zurich, Ill.

[73] Assignee: Rockwell International Corporation, El Segundo, Calif.

[21] Appl. No.: 590,897

[22] Filed: Oct. 1, 1990

[51] Int. Cl.[5] .................................. H04Q 11/04
[52] U.S. Cl. ...................... 370/59; 370/63; 365/189.02
[58] Field of Search ............. 370/58.1, 63, 59, 61; 364/200, 900; 365/189.02, 78, 77

[56] References Cited

U.S. PATENT DOCUMENTS

| | | | |
|---|---|---|---|
| 4,482,995 | 11/1984 | Binz et al. | 370/61 |
| 4,512,012 | 4/1985 | Sampei et al. | 370/63 |
| 4,545,035 | 10/1985 | Guterman | 365/185 |
| 4,658,397 | 4/1987 | Kawamura et al. | 370/63 |
| 4,672,580 | 6/1987 | Yau | 365/189.04 |
| 4,701,907 | 10/1987 | Collins | 370/63 |
| 4,716,552 | 12/1987 | Maltiel | 365/222 |
| 4,718,058 | 1/1988 | van Vugt | 370/63 |
| 4,849,964 | 6/1989 | van Baardewijk | 370/63 |
| 4,954,988 | 9/1990 | Robb | 365/189.02 |
| 4,959,774 | 9/1990 | Davis | 364/200 |

Primary Examiner—Douglas W. Olms
Assistant Examiner—T. Samuel
Attorney, Agent, or Firm—C. B. Patti; V. L. Sewell; H. F. Hamann

[57] ABSTRACT

A digital communication network (10) with a multiple space storage, time space-time configuration defined by a first, or input, time stage (12), a second, or output, time stage (14) and a preselected number of space stages (16, 22, 24) interconnected between the time stages 12, 14) that introduce time delays which are compensated for by means for time shifting the data in a shadow memory (32) relative to data in a regular memory (34). On-line expansion is accomplished by operating the network (10) off of one of the regular memory and the shadow memory (32) during the expansion, introducing the amount of compensation required by the expansion and then shifting operation over to the other memory. The selection between memories (34, 32) is achieved by means of a trislatable device (38).

24 Claims, 9 Drawing Sheets

Fig. 6B

| | 4K → 12K | 12K⁺ → 48K | 48K⁺ → 192K | 192K⁺ → 768K | 768K⁺ → 3M..... |
|---|---|---|---|---|---|
| RUNNING IM | REGULAR IM | SHADOW IM | REGULAR IM | REGULAR IM | REGULAR IM |
| STAND BY IM | SHADOW IM | REGULAR IM | SHADOW IM | SHADOW IM | SHADOW IM |
| CONNECTION SCHEME | DAISY CHAINED | FAN OUT NECESSARY | DAISY CHAINED | FAN OUT NECESSARY | DAISY CHAINED |
| ARCHITECTURE | TST | $TS^2T$ | $TS^2T$ | $TS^4T$ | $TS^4T$ |

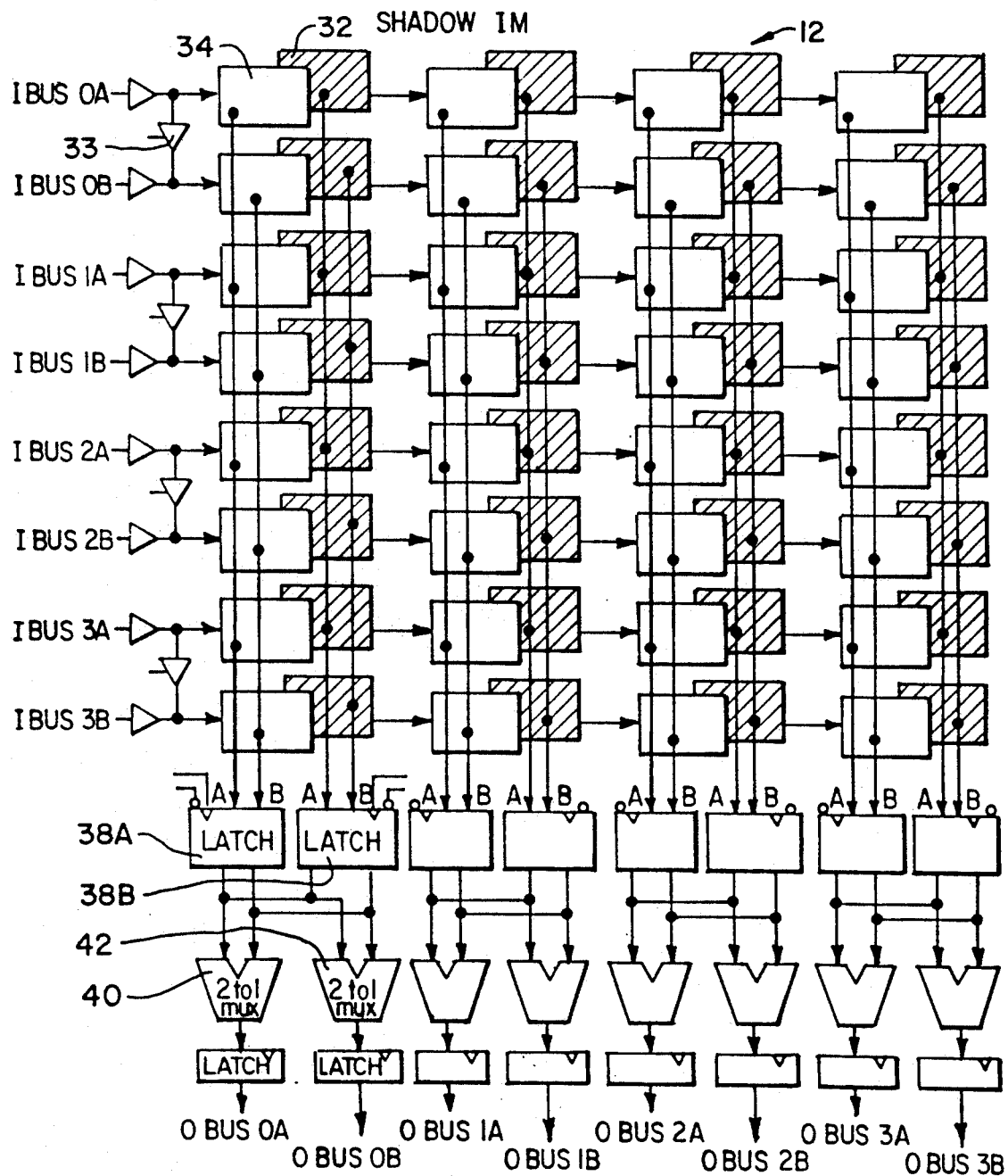

5,136,579

DIGITAL COMMUNICATIONS NETWORK WITH UNLIMITED CHANNEL EXPANDABILITY

TECHNICAL BACKGROUND

This invention generally relates to a digital communication network and apparatus and method for expanding such networks without disruption of service.

The architecture of known digital communication networks restrict unlimited channel expansion in daisy chain fashion and do not allow expansion of the network to an unlimited number of channels while maintaining a nonblocking condition.

Specifically, in known large networks, as the number of channels increases, the probability of blocking also increases. Blocking occurs whenever a node of the system is prevented from communicating with any other node of the system, or itself, which is not busy. This expansion problem results because the timing in other networks is fixed while the addition of space stages causes the addition of time delays.

Another problem with known networks is that they require more than two different printed circuit boards, or modules, in order to implement the network and any expansion elements.

Another disadvantage of known digital networks is that they do not readily provide for on line expansion.

SUMMARY OF THE INVENTION

It is therefore the principal object of the invention to provide a digital communication network which overcomes the aforementioned problems and disadvantages of known networks and, more particularly, to provide a TST type digital communication network which has unlimited, nonblocking channel expandability with on line channel expansion capability and a method for online expansion.

More particularly, it is an objective to provide a digital communication network which provides compensation for time delays to enable expansion. Specifically, such a network comprises a first time stage with a number of input channels and another number of output channels, a second time stage having a number of input channels and a plurality of output channels equal to the number of input channels o f said first time stage, a space stage assembly having a preselected number of space stages for interconnecting the output channels of the first time stage to the input channels of the second time stage, and means for providing a preselected amount of compensation for timing delays introduced by said preselected number of space stages of the space stage assembly between the first and second time stages.

In the preferred embodiment, at least one of the first and second time stages has a regular information memory, and the timing delay compensation means includes a shadow information memory which duplicates storage of data by the regular information memory and means for selectively time shifting the stored data in the shadow information memory relative to the regular information memory by an amount to compensate for said timing delays. The number of output channels of the first time stage is not less than twice the number of output channels less one to ensure that the network is nonblocking.

Another object of the present invention is to provide a digital communication network comprising means for storing communication data in a first memory, means for storing communication data in a second memory identical to the data stored in the first memory and means for selectively using one of the first memory and the second memory as a regular information memory while using the other memory as a shadow information memory for storing data identical to that stored in said regular information memory.

Thus, it is also an object to provide a method of expanding a digital communication network having a space stage with a preselected number of nodes interconnected between an input time stage and an output time stage comprising the steps of temporarily storing communication data in a first memory, temporarily storing said communication data in a second memory, operating the network off of a selected one of the first and second memories, interconnecting at least one additional space stage between the input time stage and the output time stage for communication therebetween through the other one of said first and second memories, introducing a preselected time shift to the data in said other one of the first and second memories relative to that in the selected one of the memories off of which the network is operating to compensate for any delay caused by the additional time space stage, and shifting the operation of the network from the selected one of the first and second memories to the other one of memories having the time delay needed for compensation.

BRIEF DESCRIPTION OF THE DRAWINGS

The foregoing objects, features and advantages will be explained in greater detail and other objects, features and advantages will be made apparent from the following detailed description of the preferred embodiment which is given with reference to the several figures of the drawing, in which:

FIG. 6B is a table showing the shifting functions of the regular information memory, or IM, and the shadow information memory, or SIM, of the TSnT communication network for $n=1, 2, 3$ and 4;

FIG. 7 is a functional block diagram of the configurable time slot interchanger, or CTSI, functional block of FIGS. 1 and 4 with a one to two, or 1:2, input to output configuration.

DESCRIPTION OF THE PREFERRED EMBODIMENT

Figure 1:
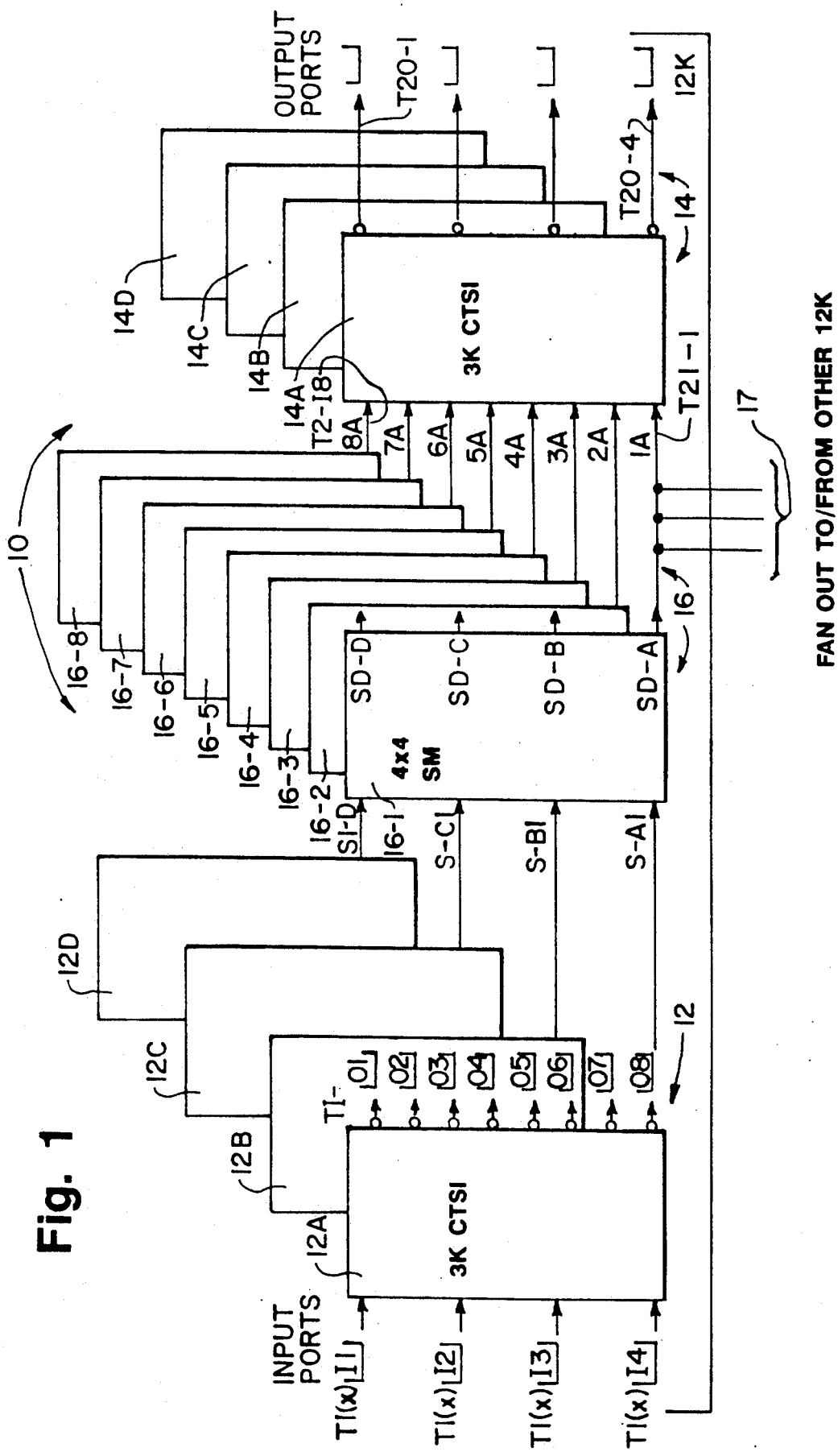
FIG. 1A is a block diagram of the preferred embodiment of the TSnT digital communications network of the present invention for the special case of $n=0$.

Referring now to FIG. 1, a first form of the digital communication network 10 of the present invention is seen to have a first, or input, time stage 12, a second, or output, time stage 14 and, at least one space stage 16 interposed therebetween. This architecture will be referred to herein as a TSnT network, in which n equals the number of space stage in excess of one. In the case of the digital communication network 10 of FIG. 1, a TSoT architecture is shown in which there are none, or zero, space stages in excess of one. Associated with each space stage are a plurality of individual terminals or nodes (not shown), each one of which needs one time slot, or communication channel, for outgoing communication and one time slot, or communication channel, for incoming communication in order to provide full duplex, or two-way, communication.

In keeping with one aspect of the invention, the network 10 has an inherent nonblocking characteristic. This is achieved by providing the input time stage with a number of input channels, or input ports, equal to twice the number of inputs less or minus one (i.e. No. Outputs $\geq 2 \times$ No. Inputs $-1$). In the case of input stage 12 of FIG. 1, the input stage 12 is defined by four conventional configurable time slot interchanges, or CTSI circuits, 12A, 12B, 12C and 12D, each of which is configured to have four input ports T1I-1 through T1I-4 and eight output ports T1O-1 through T1O-8. The incoming signals on each input port T1I-1 through T1I-4 are duplicated on pairs of outputs T1O-1 - T1O-8.

These outputs are coupled to an equal number of inputs of the time space stage 16, which is formed of eight conventional switching matrices, or SMs, 16-1 through 16-8, each of which has four input ports SIA through SID respectively connected with a different output port T1O-1 through T1O-8 of CTSI circuits 12A through 12D, respectively.

Each of the eight switching matrices 16-1 through 16-8 has four outputs SOA through SOB, each of which is associated with one of eight inputs T2I-1 through T2I-8 of four associated second, or output, configurable time slot interchanges, or CTSIs, 14A through 14B. The output time slot interchanger 14A-14B are identical to the input CTSIs 12A-12B except they have been configured to have eight inputs T2I-1 through T2I-8 and four outputs T2O-1 through T2O-4. These output ports T2O-1 through T2O-4, in turn, are selectively coupled to one of the four inputs port T1I-1 through T1I-4 of one of the four input CTSI's 12A through 12D, or to the inputs of another network which, in turn, has outputs coupled to one of the input CTS1 inputs T2I-1 through T2I-4.

Advantageously, each input bus T2I-1 through T2I-8 of the CTSIs 14A-14D is combined with another input bus T2I-1 through T2I-8 (not shown), or shadow input bus. This arrangement guarantees the nonblocking characteristic of the network.

Using a 3K port CTSIs 12A-12D and 14A-14D as a basic building block, the set of eight CTSIs 12A-12D and 14A-14D and eight SMs 16-1 through 16-8 forms a 12K port system. This TSoT architecture of network 10 allows the number of ports to be expanded to a 48K port network for a 400% increase without the necessity of adding more space stages 16.

Figure 2:
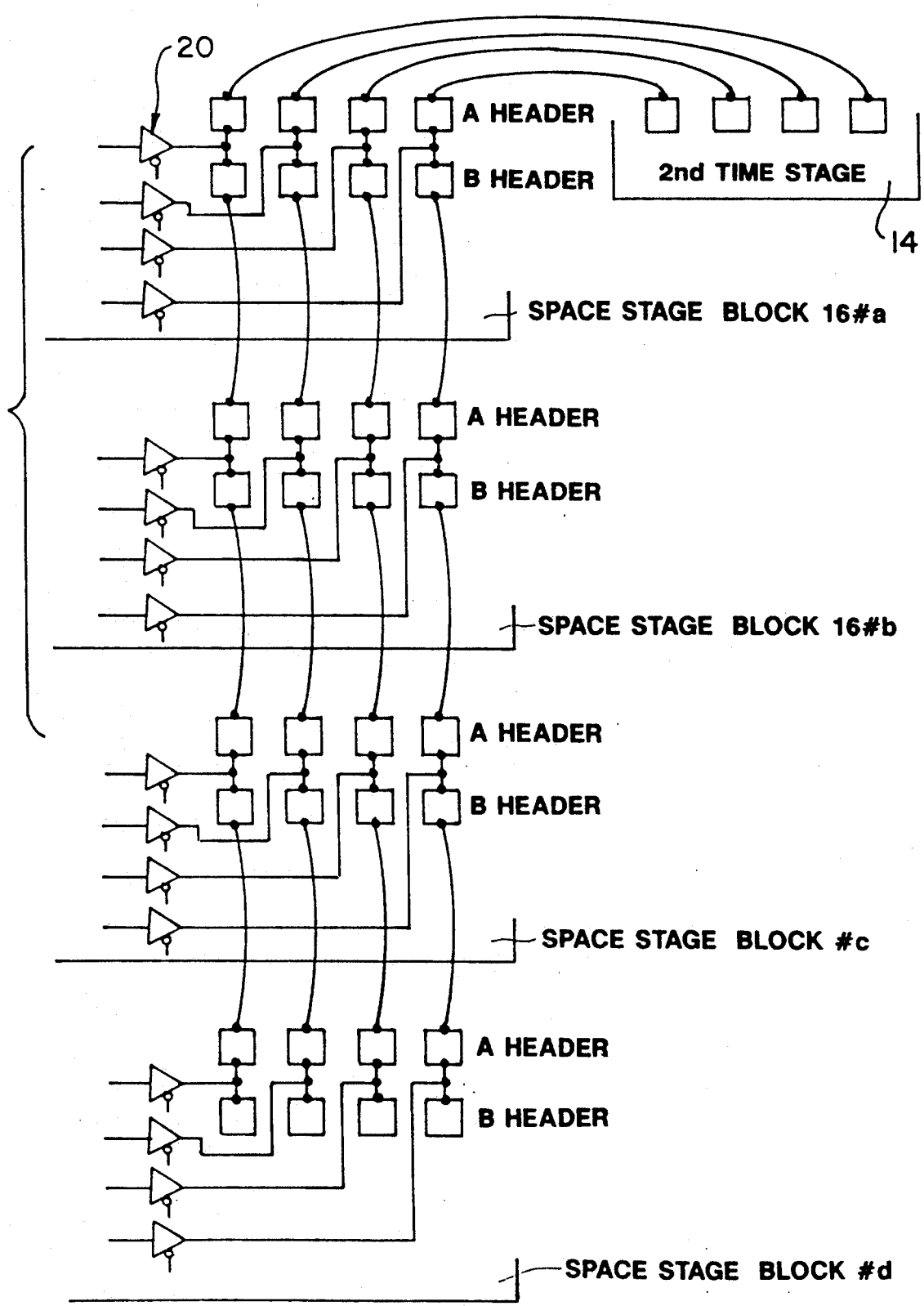
FIG. 2 is a block diagram of a portion the TSnT communication network of FIG. 1 for the special case of $n=0$ which has been daisy chain expanded without the introduction of additional time delay by the space stage.

However, referring to FIG. 2, advantageously, the number of ports can be expanded by means of a daisy chained expansion of the space stage 16 without any need to change the timing. Each set of eight outputs SOA through SOB of the eight SMs 16-1 through 16-8 of the space stage 16 has associated therewith four identical fanouts as schematically illustrated by fanout 17 of FIG. 1, which are driven by four trislatable devices 20. This allows four blocks 16A, 16B, 16C and 16D of selected size to be tied together in a daisy chained fashion. Such blocks can be in size 3K (mini block), 12K (block), 48K (large block), 192K (mega block) and 768K (super block) and even larger. For the expansion from a 12K block to a 24K block, header B of block 16A is cabled up to block header A of space stage block 16B. In order to obtain the expansion from 36K to 48K, cable up header B of block 16B is cabled up to header A of block 16C. The expansion factor of 400% in this TSoT architecture is only limited by the comparative delay introduced by the high Z state of the trislatable devices 20. This factor can be significantly increased if custom designed trislatable latches of lower output capacitance than are presently available are used.

Figure 3:
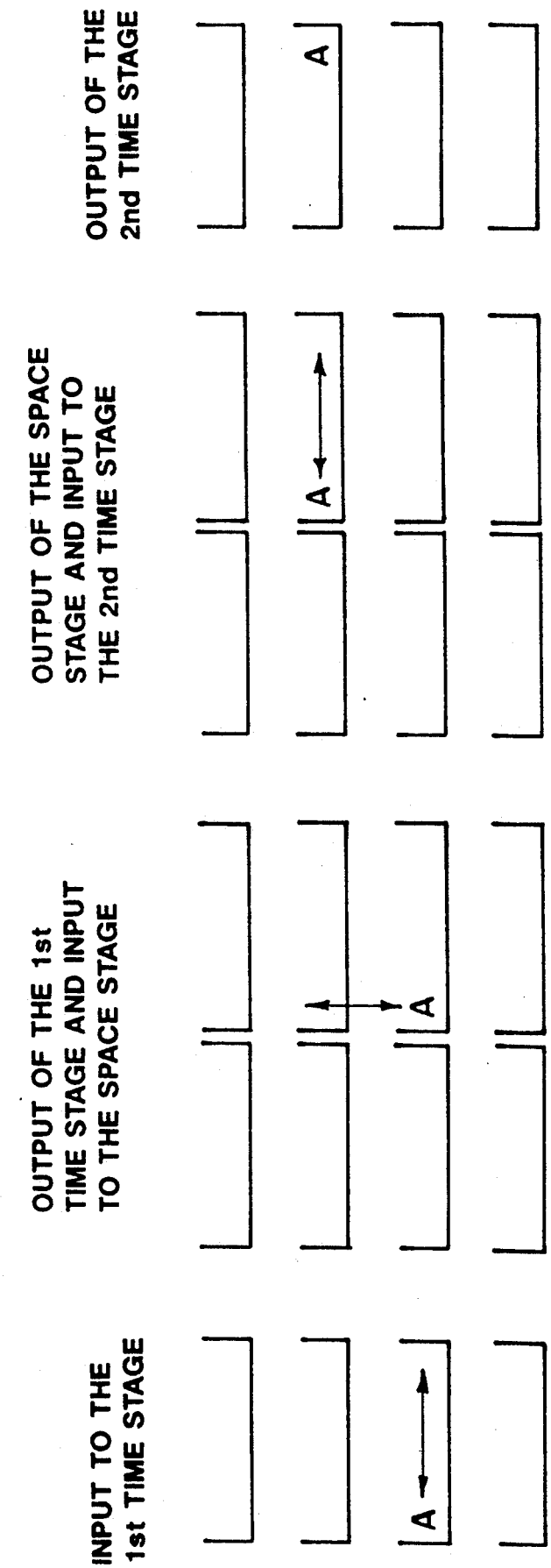
FIG. 3 is a schematic illustration of the basic switching sequence in the TSnT communication network of FIG. 1.

Referring to FIG. 3, the basic switching functions inside the TSoT network 10 of FIG. 1 is illustrated. In the first time stage, the bandwidth of each input bus is doubled to give the nonblocking property. Thus, four input buses T1I-1 through T1I-4 result in eight output buses T10-1 through T10-B. This is graphically illustrated by a movement of a data sample "A" in the vertical direction of arrow 21 (up or down) at the output of the first time stage 12 and input to the space stage 16. Also, as shown in FIG. 3, a sample "A" is switched in time to a different timeslot of the output bus, as graphically illustrated by movement of the sample in the horizontal direction of arrow 23 (left or right) at the output of the space stage and the input to the second time stage 14. Finally, in the second time stage 14, the sample "A" is switched horizontally to its designated output.

These two graphical representations of time and space switching are helpful, for the path searching algorithm to control the switching in this TSnT architecture can be simplified a great deal if the concept of a Cartesian coordinate of two dimensions x and y to build the data base is used. The switching of a data sample, in turn, can be associated with an x coordinate and the switching of a data sample in space can be associated with a y coordinate. This approach is very similar to that used in the data base of bit mapped systems. Since all high level language contains two dimensional arrays structures, generating this type control software is simple.

Figure 4:
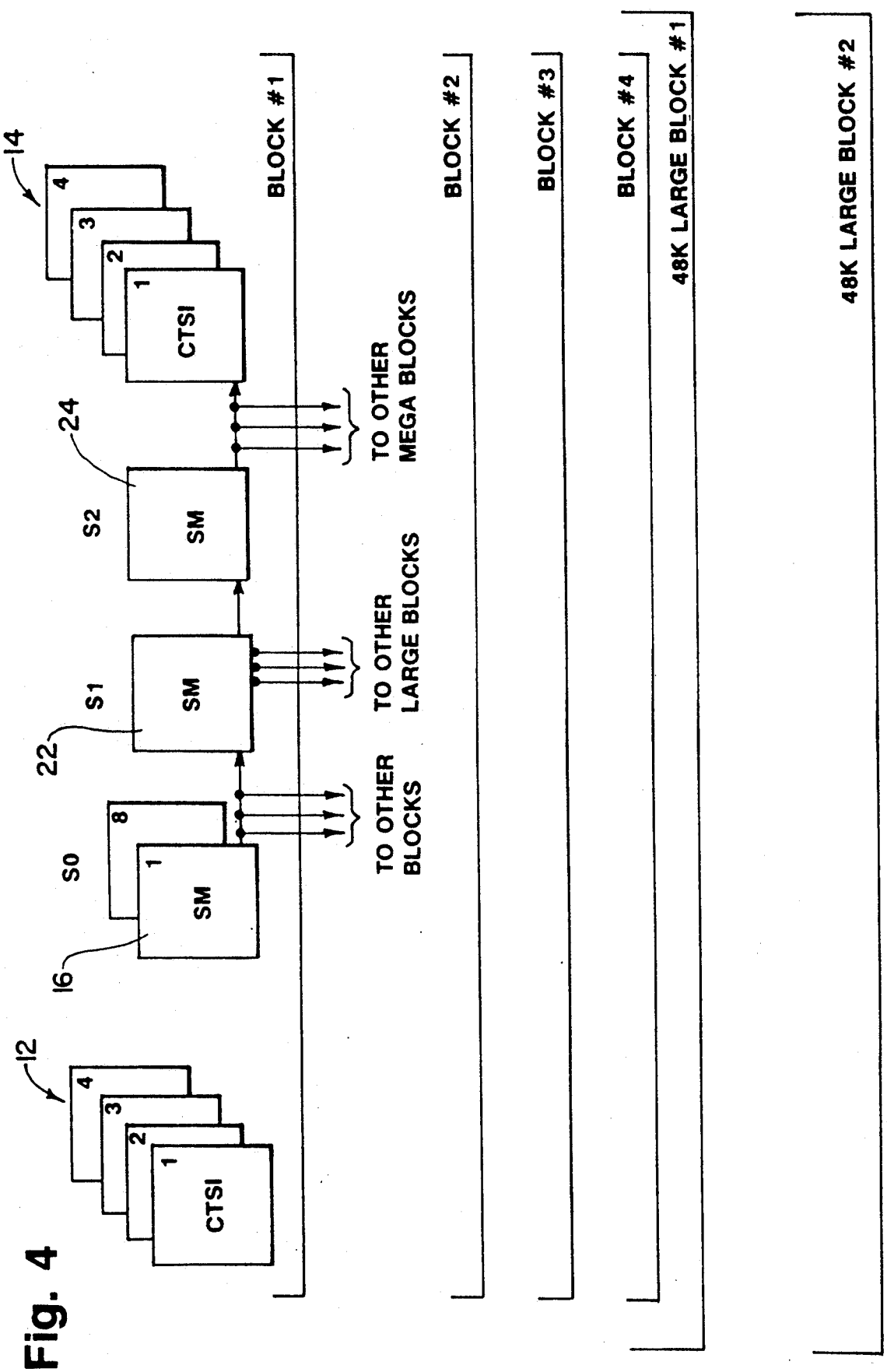
FIG. 4 is a block diagram of the preferred embodiment of the TSnT communications network of the present invention for the special case of $n=2$ in which fanouts to other space stage blocks are provided for expansion without additional time delays.
Figure 5:
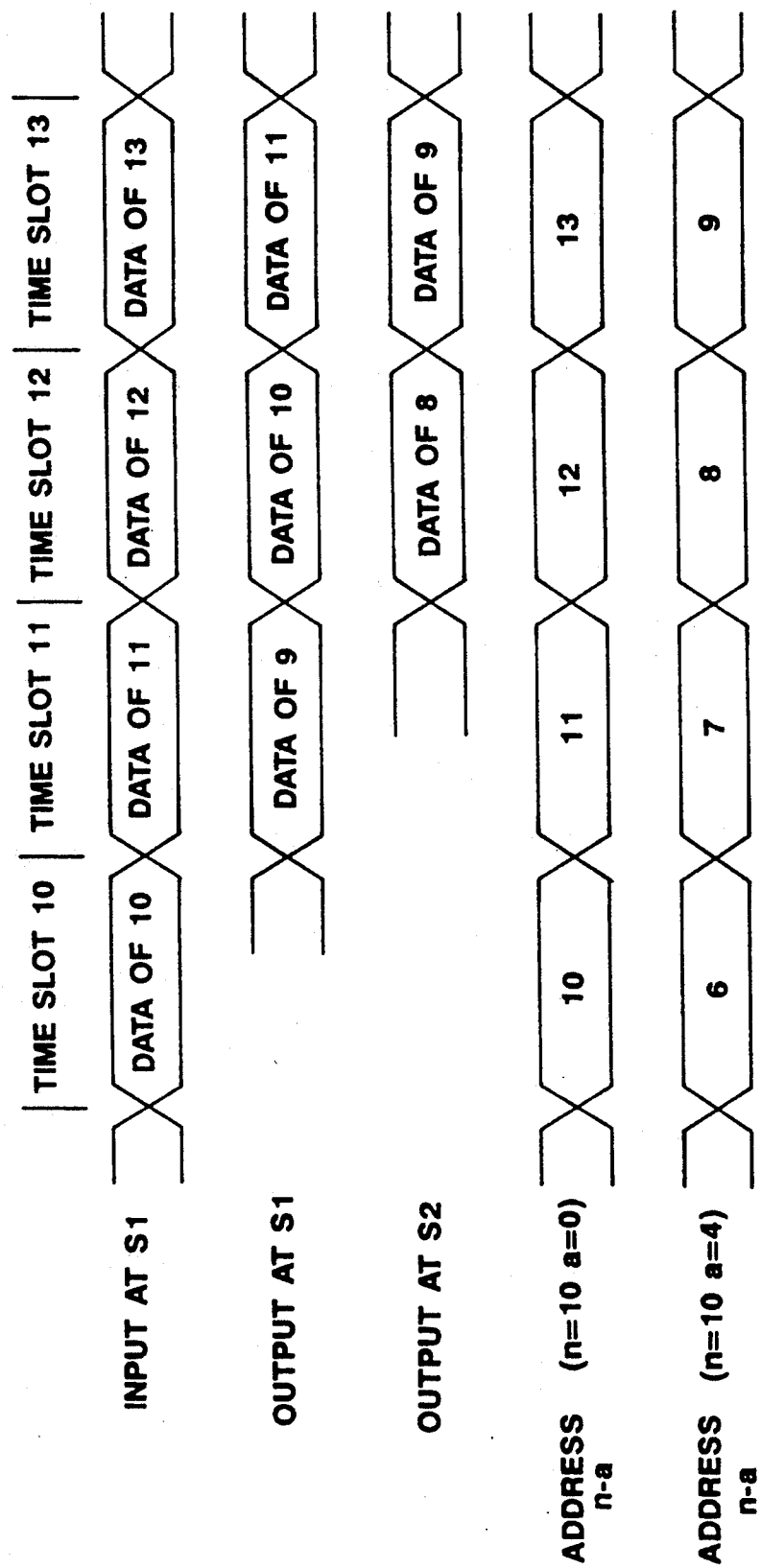
FIG. 5 is a timing diagram which illustrates the delay in the shadow information pointer of the CTSI of FIG. 4 to accommodate for the delay through two additional space stages relative to the network of FIG. 1.

Another important feature of the invention enables expansion with additional space stages. At an expansion from 48K to 96K, two additional space stages 18 and 20 are required to create a TSnT configuration shown in FIG. 4. In such case, the shadow information memory of the CTSI of output time stage 14 are being used to accept data transmitted by the space stages. The shadow information memory contains the exact same data as the regular information memory. However, its output pointer is pointing to an n-a value while the pointer of the regular information memory is pointing to an n value. The n value represents the current time slot and, the a value represents the time delay through the additional space stages 22 and 24. The timing diagram in FIG. 5, illustrates the necessary delay in the shadow information memory output pointer to accommodate for the delay through the additional space stages 22 and 24, FIG. 4.

The shadow fanout at the first time stage 12 is transmitted to the first space stage 22, which has a fanout of four to allow a four times expansion. One of the fanouts of the second space stage 22 is transmitted to the third space stage 24. Space stage 24 receives this data and transmits it toward the CTSI shadow information memory SIM of the second time stage 14. Once the CTSIs have received the data in their SIMs, the existing large block (48K) CTSIs can switch their listen bus over to the SIM side. From 48K to 192K, all CTSIs of the second time stage 18 will use the SIM as the running or active information memory. The regular information memory is held on standby, and it can be used as a spare to increase the fault tolerance of the system.

Upon power up of the new equipment, the trislatable devices 20 receive a control word that will place them in a high impedance state. It is preferably verified that this high impedance state is reached before connecting to the existing equipment, for otherwise, the connection may corrupt the flow of data inside the network.

Advantageously, this feature allows on line expansion procedure which is lacking in known digital communication networks. The method in which the shifting is performed is by selectively changing the state of a trislatable latch interconnected with the first and second memory. In the case of the TSnT architecture being applied to establish a communication network for a multiprocessing environment, each processor is assigned a communication port number. Since the TSnT network 10 is nonblocking, any processor in this architecture can communicate at any time to any other processor in the network with virtually no overload. The online expansion capability allows new equipment to be installed without interrupting any running tasks in the network.

It should be noted that in the past, use of a shadow information memory has been limited to the storing of duplicate data to provide the nonblocking characteristic in high performance networks. The utilization of a shadow information memory in TSnT digital communication network 10, on the other hand, is a definite departure from this traditional role, since it is used to resynchronize the storing of data. This resynchronization compensates for the extra delays introduced by the expansion space matrixes, such as stages 22 and 24, FIG. 4.

Figure 6A:
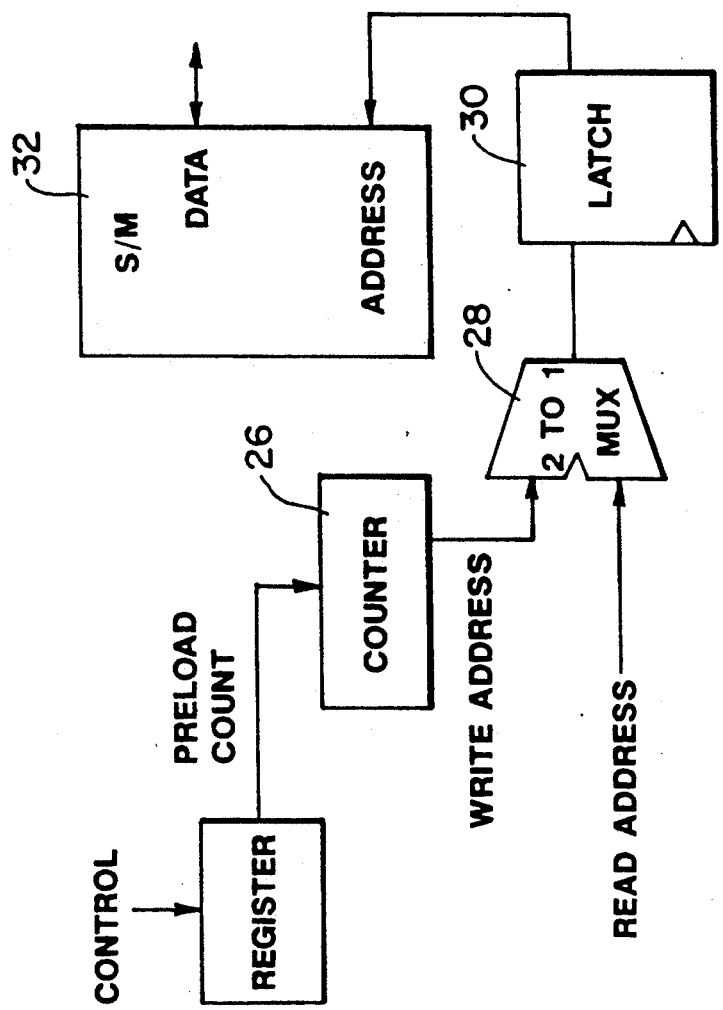
FIG. 6A is a functional block diagram of the preferred embodiment of the controller for time shifting data in the shadow information memory, or SIM, relative to the regular memory of FIG. 7.

Referring to FIG. 6A, a preferred implementation of the SIM control is shown. The SIM 32 is provided with an independent counter 26 to provide sequential addressing during its write cycles. This counter 26 receives a programmable preload count from a control register which compensates for the delays of data through the additional space matrices 22 and 24, FIG. 4, by altering the write addresses passed through the 2:1 multiplexer 28 and latch 30 to the SIM data addresses 32.

In keeping with another aspect of the invention, the shadow information memory is used as a standby memory to replace the regular information memory if the latter happens to be faulty. As already noted, the shadow and the regular information memory change rolls during each expansion, so sometimes the regular information memory acts as a backup for the SIM 32.

Expansion beyond the 192K size requires five space stages and is, thus, referred to as a TS4T network. In such case, the regular information memory is used to compensate for the additional space stages. Generally, the table of FIG. 6B tabulates the varying roles played by the regular and shadow information memories for the different levels of expansion.

The CTSIs, 12A and 14A, for instance, have two possible configurations. At the input time stage 12 of network 10, FIG. 1, the CTSIs are configured as a 1:2 TSII, as shown in greater detail in FIG. 7. In such case, the driver link 33 between bus A and bus B is turned on so, that bus A and B have the same data, i.e. both outputs are turned on, or enabled. At the output time stage 14 of the network, the CTSIs are configured as a 2:1 TSI. In such case, the driver link 32 between bus A and B is off. Bus A and B carry different data and only one of the two outputs is used.

The driver of each bus is divided into two equal components. One drives the regular information memory 34 and the other drives the shadow information memory 32. The regular information memory arrays receive data from the regular fanout 17, FIG. 1, of the space stage 16 and the SIM memory arrays 32 receive data from a shadow fanout of the space matrix. The selection between the regular IM 32 and shadow IM 34 is done by trislatable latches 38. These latches 38 are always latching in new data. However, only one of the two latches 38A and 38B respectively associated with the IM 34 and the SIM 32 is enabled at any given time. The 2:1 multiplexers, or muxes, 40 are used in conjunction with the driver link 33 between bus A and bus B to reconfigure the I/0 of the CTSI. In a 1:2 configuration, the 2:1 mux 40 which produces output OBUSNA is set to always select the A side, and the 2:1 mux 42 which produces output OBUSNB is set to always select the B side. In this 1:2 configuration, the IBUSNB inputs are left open and all eight output buses are used.

In the 2:1 configuration, the driver link between bus A and B is off. All of the input buses are connected. The 2:1 muxes which generate OBUSNB are turned off. The 2:1 muxes which generate OBUSNA are dynamically selecting A or B side to transmit out to the OBUSNA port.

Figure 8:
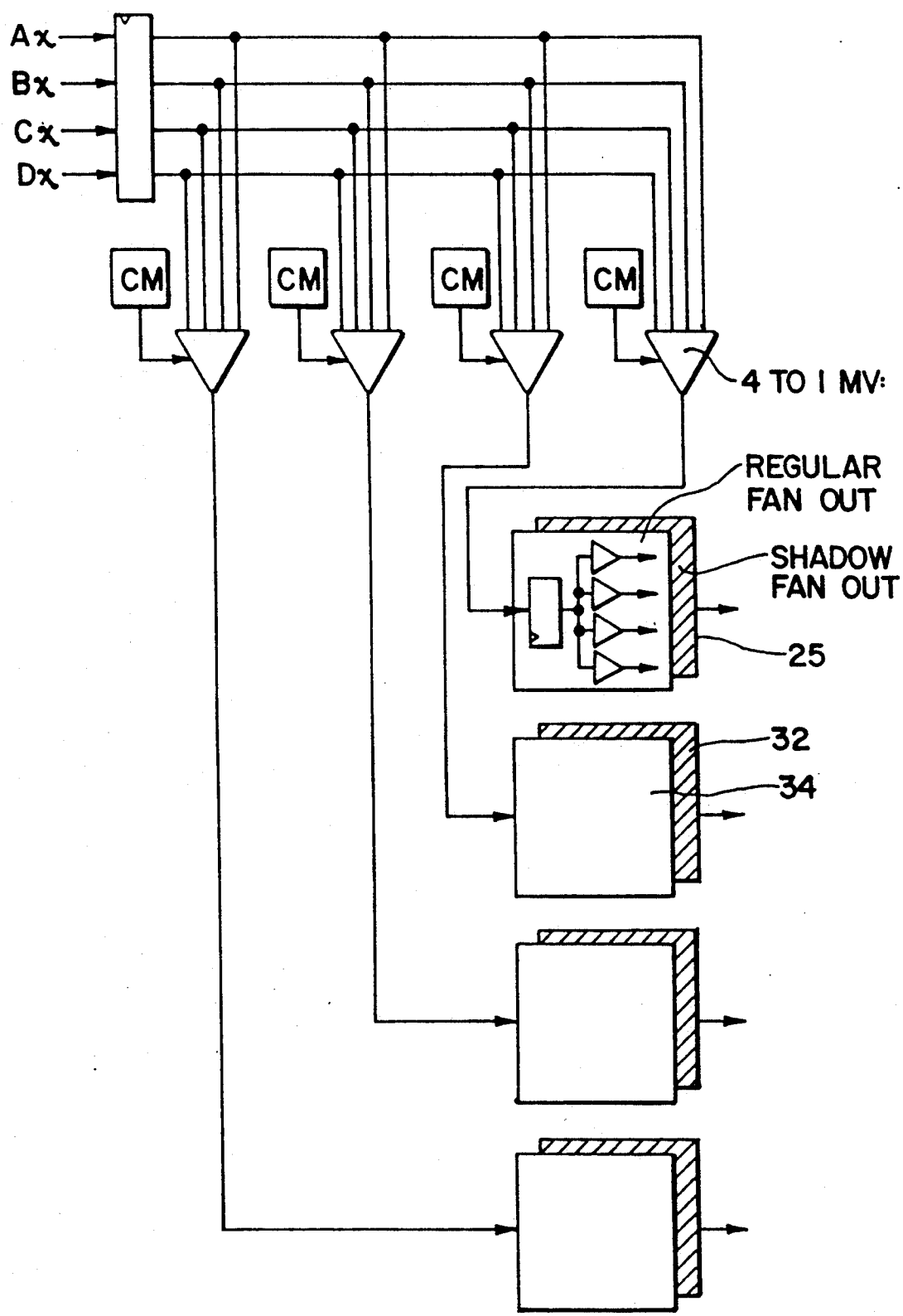
FIG. 8 is a functional block diagram of the space matrix, or SM, of FIGS. 1 and 4.

The space stage 16 is preferably defined by a plurality of 4×4 spaces matrices each of which has four input bus outputs SI-A through SI-D and four output buses as shown in FIG. 8. Each of the four outputs bus SO-A through SO-D has four regular fanouts and four shadow fanouts which transmit identical data. All fanouts are trislatable to allow a daisy chained expansion. The SM can also function as a 1:4 buffer. In the case shown in FIG. 8, each 4:1 mux is set to select a different input bus, and the fanouts are always on.

While a detailed description of the preferred embodiment of the invention has been given, it should be appreciated that many variations can be made thereto without departing form the scope of the invention as set forth in the appended claims.

I claim:

1. A digital communication network, comprising:
a first time stage with a number of input channels and another number of output channels;
a second time stage having a plurality of output channels equal to the number of input channels of said first time stage and a number of input channels;
a space stage assembly having a preselected number of space stages for interconnecting the output channels of the first time stage to the input channels of the second time stage, said space stage assembly introducing time delays between the first and second time stages depending upon the preselected number of space stages; and means for providing a preselected amount of compensation for the timing delays introduced by said preselected number of space stages of the space stage assembly between the first and second time stages.

2. The digital communication network of claim 1 in which at least one of said first and second time stages has a regular information memory, and said timing compensation providing means includes a shadow information memory which duplicates storage of data by said regular information memory, and means for selectively time shifting said data stored in the shadow information memory relative to the regular information memory by an amount to compensate for said timing delays.

3. The digital communication network of claim 2 in which said time shifting means includes means for providing sequential addresses for storage location in said shadow memory during write cycles, and means for selectively altering the addresses provided by the sequential addresses providing means to compensate for the delays introduced by said preselected number of space stages.

4. The digital communication network of claim 3 in which said sequential address providing means includes an independent counter for sequentially generating addresses, and said selectively altering means includes means for entering a preselected preload count in said counter having a value corresponding to the amount needed for compensation for said delay.

5. The digital communication network of claim 4 in which said preselected preload count entering means includes a programmable control register coupled to the counter.

6. The digital communication network of claim 1 in which the number of output channels of the first time stage is not less than twice the number of input channels of the first time stage less one to provide the network with a nonblocking characteristic.

7. The diqital communication network of claim 1 in which both the first and second time stages are substantially entirely comprised of a plurality of substantially identical configurable time slot interchangers.

8. The digital communication network of claim 7 in which the space stage is substantially entirely comprised of substantially identical switching matrices.

9. The digital communication network of claim 1 in which said at least one of the preselected number of space stages has a plurality of substantially identical space stage blocks, and means for interconnecting said space stage blocks in daisy chain fashion.

10. The digital communication network of claim 9 in which said interconnecting means includes a fanout connector for each of said plurality of space stage blocks;

means including at least one trislatable latch for interconnecting each of the fanout connectors with a space stage block.

11. The digital communication network of claim 10 in which each of said fanout connectors has a pair of interconnected headers selectable by a trislatable latch connected therewith.

12. The digital communication network of claim 1 in which there are a plurality of serially connected space stages, and each space stage includes both a regular output and a shadow fanout, and said second time stage includes a regular memory for receipt of data from the regular output and a shadow memory for receipt of data from the shadow fanout, and means for selectively outputting data from the regular memory and the shadow memory.

13. The digital communication network of claim 12 in which said selectively outputting means has a listen bus, and means for switching the listen bus between the regular memory and the shadow memory.

14. The digital communication network of claim 13 in which said switching means includes a trislatable switch.

15. A digital communication network, comprising:

means for storing communication data in a first memory;

means for storing communication data in a second memory identical to the data stored in the first memory; and means for selectively, interchangeably using one of the first memory and the second memory as a regular information memory while using the other of the first memory and the second memory as a shadow information memory for storing data identical to that stored in said regular information memory.

16. The digital communication network of claim 15 in which said selectively using means includes a pair of trislatable latches respectively associated with said first and second memories, and means for selectively enabling one of the pair of trislatable latches.

17. The digital communication network of claim 15 including means for selectively introducing a time shift in either one of said first and second memories relative to the other one of said memories.

18. The digital communication network of claim 1 in which the first and second memories form a time stage having a number of output channels and a number of inputs, and the number of output channels of said input time stage is not less than twice the number of input channels of the input time stage minus one.

19. A method of expanding a digital communication network having a space stage with a preselected number of nodes interconnected between an input time stage and an output time stage, comprising:

temporarily storing communication data in a first memory;

temporarily storing said communication data in a second memory;

operating the network off of a selected one of the first and second memories;

interconnecting at least one additional space stage between the input time stage and the output time stage for communication therebetween through the other one of said first and second memories;

introducing a preselected time shift to the data in said other one of the first and second memories relative to that in the selected one of the memories off of which the network is operating to compensate for any delay caused by the additional time space stage; and shifting the operation of the network from the selected one of the first and second memories to the other one of memories having the time delay needed for compensation.

20. The method of claim 19 including the steps of interconnecting at least one second additional space stage between the input time stage and the output time stage for communication therebetween through the selected one of the first and second memories;

introducing a preselected time shift to the data in said other one of the first and second memories relative to that in the selected one of the memories off of which the network is operating to compensate for any delay caused by the second additional space stage;

reshifting the operation of the network from the other one of the first and second memories to the selected memory having the time shift needed to compensate for the delay caused by said second additional time stage.

21. The method of claim 20 in which said shifting is performed by selectively changing the state of a trislatable latch interconnected with said first and second memory.

22. The method of claim 20 including the step of adding at least one additional stage in parallel with to said space stage without introducing any additional time delay.

23. The method of claim 22 in which said stage of adding at least one additional space stage includes the step of adding additional parallel space stages in daisy chain fashion.

24. The method of claim 19 including the step of providing said input time stage with a number of output channels not less than twice the number of input channels less one in order to obtain a nonblocking condition for the network.

* * * * *